(12) United States Patent
Konanur et al.

(10) Patent No.: US 9,831,028 B2
(45) Date of Patent: Nov. 28, 2017

(54) DISSYMMETRIC COIL ANTENNA TO FACILITATE NEAR FIELD COUPLING

(75) Inventors: Anand S. Konanur, Sunnyvale, CA (US); Ulun Karacaoglu, San Diego, CA (US); Songnan Yang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,047

(22) PCT Filed: Dec. 21, 2011

(86) PCT No.: PCT/US2011/066586
§ 371 (c)(1),
(2), (4) Date: Mar. 31, 2014

(87) PCT Pub. No.: WO2013/095458
PCT Pub. Date: Jun. 27, 2013

(65) Prior Publication Data
US 2014/0203990 A1    Jul. 24, 2014

(51) Int. Cl.
| | |
|---|---|
| H04B 5/00 | (2006.01) |
| H01F 38/14 | (2006.01) |
| H01Q 7/00 | (2006.01) |
| G06K 7/10 | (2006.01) |

(52) U.S. Cl.
CPC ......... *H01F 38/14* (2013.01); *G06K 7/10237* (2013.01); *G06K 7/10336* (2013.01); *H01Q 7/00* (2013.01)

(58) Field of Classification Search
CPC ...... H01Q 7/00; H01F 38/14; G06K 7/10237; G06K 7/10336

USPC ....... 455/41.1, 63.1, 575.1, 562.1, 129, 274; 343/908
See application file for complete search history.

(56) References Cited

U.S. PATENT DOCUMENTS

| | | | | |
|---|---|---|---|---|
| 4,996,481 | A * | 2/1991 | Ackerman | G01R 33/341 324/318 |
| 6,975,834 | B1 * | 12/2005 | Forster | G06K 19/0724 343/728 |
| 2008/0245851 | A1 | 10/2008 | Kowalski | |
| 2009/0015496 | A1 * | 1/2009 | Liu | 343/742 |

(Continued)

FOREIGN PATENT DOCUMENTS

| | | |
|---|---|---|
| JP | 2008-040972 A | 2/2008 |
| KR | 10-1040221 B1 | 6/2011 |

(Continued)

OTHER PUBLICATIONS

International Preliminary Report on Patentability and Written Opinion received for PCT Patent Application No. PCT/US2011/066586, mailed on Jul. 3, 2014, 8 pages.

(Continued)

*Primary Examiner* — Ping Hsieh
(74) *Attorney, Agent, or Firm* — Schiff Hardin LLP

(57) ABSTRACT

Described herein are techniques related to near field coupling and wireless power transfers. For example, a coil antenna configuration is the same in all portable devices; however, when the portable devices are arranged in back to back position with one another, the coil antenna configuration defines a dissymmetric and antenna configuration.

20 Claims, 4 Drawing Sheets

(56) References Cited

U.S. PATENT DOCUMENTS

2010/0190436 A1* 7/2010 Cook et al. ................ 455/41.1

FOREIGN PATENT DOCUMENTS

| | | |
|---|---|---|
| WO | 2010/093307 A1 | 8/2010 |
| WO | 2013/095458 A1 | 6/2013 |

OTHER PUBLICATIONS

International Search Report and Written Opinion Received for PCT Patent Application No. PCT/US2011/66586, Mailed on Sep. 14, 2012, 8 pages.

* cited by examiner

DISSYMMETRIC COIL ANTENNA TO FACILITATE NEAR FIELD COUPLING

BACKGROUND

Recently, technologies have arisen that allow near field coupling (such as wireless power transfers (WPT) and near field communications (NFC)) between electronic devices in close proximity to each other and more particularly, thin portable electronic devices. Both near field coupling functions use radio frequency (RF) antennas in each of the devices to transmit and receive electromagnetic signals. Because of user desires (and/or for esthetic reasons) many of these portable devices are small, and are becoming smaller as markets evolve, and tend to have exaggerated aspect ratios when viewed from the side. As a result, many of these thin portable devices incorporate flat antennas, which use coils of conductive material as their radiating antennas for use in near field coupling functions.

A conventional NFC antenna configuration in the thin portable devices may create over coupling when arranged in back to back position with one another (e.g. during Peer-2-Peer operation mode of NFC). For example, the thin portable device may not generate efficient WPT and NFC when the antenna configuration is a mirror image of one another. Accordingly, an antenna configuration may be implemented to efficiently perform NFC and/or WPT in the thin portable devices.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for coupling antennas of devices and more particularly for coupling coil antennas of thin portable electronic devices for improving near field coupling capabilities of the devices. Near field coupling includes (by way of illustration and not limitation) wireless power transfer (WPT) and/or near field communications (NFC) capabilities of the portable devices. For example, the portable device may include a continuous loop of coil antenna line installed at a housing of the portable device. The coil antenna line may form a closed loop that defines at least a plane. In an implementation, when the plane is horizontally flipped at one hundred eighty degrees (180°) and superimposed upon the plane, which is originally defined by the closed loop, a minimal overlapping area is created. In other words, the coil antenna includes the same configuration as to all portable devices; however, when the portable devices are aligned in back to back location with one another, the coil antenna configuration may form a dissymmetric antenna. The dissymmetric antenna may create the minimal overlapping area when superimposed in the above position—in order to prevent over coupling during NFC and/or WPT operations. Furthermore, the dissymmetric antenna may provide efficient operation at a resonant frequency.

Figure 1:
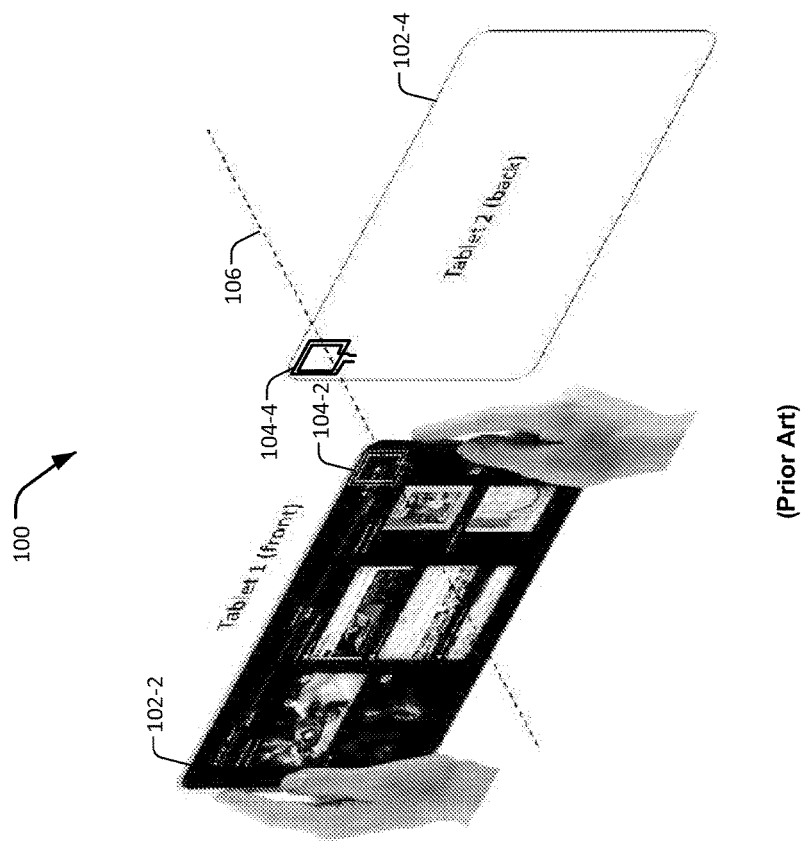
FIG. 1 illustrates portable devices in an example near field coupling arrangement.

FIG. 1 illustrates an example arrangement 100 of portable devices for near field coupling. More particularly, users may have a desire to operate near field coupling enabled portable electronic devices and/or other devices in certain ergonomically convenient manners. Examples of such portable devices include (but are not limited to) mobile phone, a cellular phone, smartphone, a personal digital assistant, a tablet computer, a netbook, a notebook computer, a laptop computer, a multimedia playback device, a digital music player, a digital video player, a navigational device, a digital camera, and the like.

In an implementation, FIG. 1 shows a so-called "peer-to-peer P2P) NFC" where two users (not shown) align their NFC-enabled portable devices 102-2 and 102-4 together in a back to back manner to perform NFC-related information sharing functions. FIG. 1 shows an often desired back to back arrangement of the portable devices 102 for NFC and/or WPT purposes. With conventional NFC-enabled devices, the near field coupling would be inefficient or ineffective because of over coupling in near field coupling components (e.g., antenna) in conventional devices, which constrains the ability of users to effectively employ the desired arrangements shown in FIG. 1. To this end, an antenna configuration may be implemented at the portable devices 102 to perform the "P2P NFC" efficiently.

In an implementation, the portable devices 102 may include the antenna configuration to perform and/or establish near field coupling to perform the "P2P NFC." The "P2P NFC" may include sharing of resources, such as, processing power, disk storage or network bandwidth, etc, that are directly available between NFC coupled portable devices 102. For example, the two users (not shown) of the portable devices may align the portable device 102-2 with the portable device 102-4. Specifically, antenna 104-2 of the portable device 102-2 is aligned with antenna 104-4 of the portable device 102-4. In this example, the alignment is shown by line 106. In other implementations, the arrangement of the portable devices 102 in FIG. 1 may be used for WPT purposes.

Example Symmetric Antenna

Figure 2:
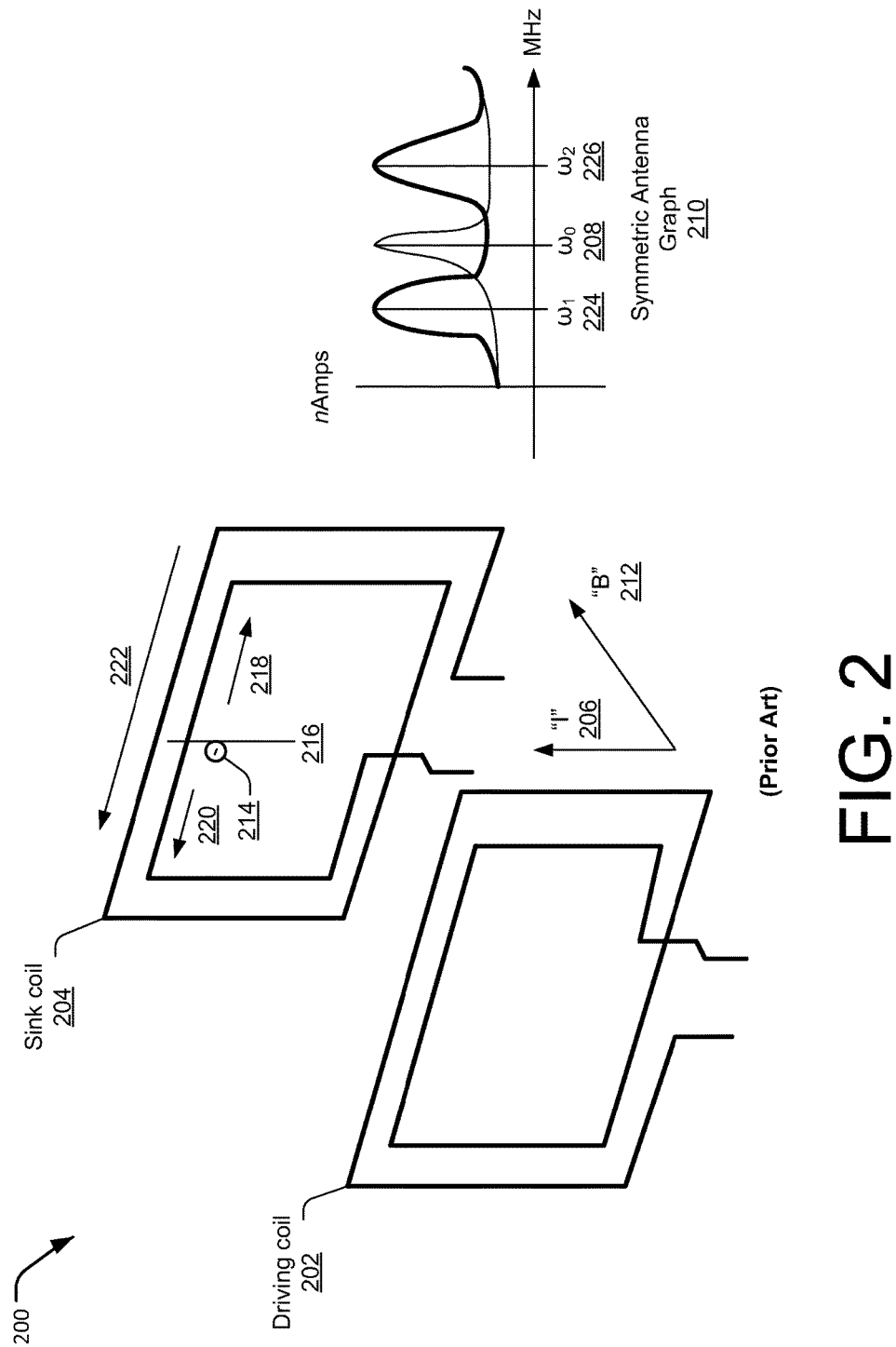
FIG. 2 illustrates a perspective view of an example symmetric antenna.

FIG. 2 illustrates a perspective view 200 of disassembled symmetric antenna configuration between portable devices 102. In an implementation, the driving coil 202 may include the same antenna configuration as sink coil 204. The driving coil 202 may be located in a first portable device (e.g., portable device 102-2), and the sink coil may be located in a second portable device (e.g., portable device 102-4). In the perspective view 200, the portable device 102-2 (as shown in FIG. 1) is arranged and aligned in back-to-back location with the portable device 102-4 (as shown in FIG. 1). In this arrangement, the driving coil 202 may define a plane that is equivalent to a horizontally flipped configuration of the sink coil 204. In this configuration, the driving coil 202 may form the plane that is at least a mirror image of the sink coil 204 when aligned. For example, when the driving coil 202 is aligned (and superimposed) with the sink coil 204, the plane defined by the driving coil 202 are congruent (or mostly overlapping) with the area defined by the sink coil 204. In other words, the driving coil 202 may define a large area of symmetry when the driving coil 202 is horizontally flipped, and superimposed with the sink coil 204.

In an implementation, the driving coil 202 may be operated to establish near field coupling with the sink coil 204.

For example, a current "I" 206 is generated at the driving coil 202, and the current "I" 206 is generated at a resonant frequency of omega zero ($\omega_0$) 208 (as shown in symmetric antenna graph 210). The resonant frequency at $\omega_0$ 208 may include an operational frequency (e.g., 13.56 MHz) of near field coupling where a maximum induced current may be obtained. At $\omega_0$ 208, the maximum induced current may provide efficient maximum energy transfer for NFC and/or WPT purposes. The "I" 206 may include a magnetic field "B" 212 that is perpendicular to the "I" 206. Further, the magnetic field "B" 212 may rotate at a counter-clockwise direction following "right-hand-rule" in electromagnetic theory.

Consider the "I" 206 to be flowing at counter-clockwise direction at the resonant frequency of 13.56 MHz (i.e., at $\omega_0$ 208), and consider an electron 214 as it passes through a specific location 216 at the sink coil 204. The electron 214 is a negatively charged particle. Since like charges repel each other, the electron 214 may be repelled at forward direction 218, or may be repelled at a backward direction 220. The two reactions for the electron 212 may be referred to as components due to capacitive coupling. In other words, the coupling defined by the two reactions for the electron 214 may similarly be inferred to a capacitor that includes an electron (e.g., electron 214) flowing onto one plate, and repelled by another electron at another plate.

Furthermore, following Lenz's law, a separately induced current at the sink coil 204 in backward direction 222 may be generated by the magnetic field "B" 212. The backward direction 222 reaction may be referred to as a component due to inductive coupling. At backward direction, the induced current at the backward direction 222 and the induced current (due to capacitive coupling) at backward direction 220 tend to reinforce one another. In other words, the induced currents in the backward directions 220 and 220 support one another to create the backward induced currents at the sink coil 204. However, at forward direction, the induced current (i.e., due to capacitive coupling) at the forward 218 direction, and the induced current at the backward direction 222 (i.e., due to inductive coupling), may tend to cancel one another.

Since the driving coil 202 and the sink coil 204 defines a symmetric configuration, a large area of overlap (when aligned) may create a large value of induced currents due to inductive coupling at the backward direction 222. Similarly, a large value of induced current due to capacitive coupling is created at the backward direction 220 and at the forward direction 2218. The large value of the induced currents due to the capacitive coupling and the inductive coupling may result from the direction of the magnetic field "B" 212 created by the electric field "I" 206. The magnetic field "B" 212 is known to create maximum magnetic field energy when the magnetic field "B" 208 is ninety (90°) perpendicular with the driving coil 202. To this end, when the sink coil 204 is aligned with the driving coil 202, the large area of overlap at the sink coil 204 may receive the maximum magnetic field energy.

The large value of induced currents at the sink coil 204 may create over coupling at the symmetric antenna defined by the driving coil 202 and the sink coil 204. The large value of induced currents may result to maximum currents at frequencies other than the resonant frequency at the $\omega_0$ 208. For example, the opposite directions (i.e., backward directions 220 and 222, and forward direction 218) of the induced currents at the sink coil 204 may similarly create an expanding magnetic field (not shown) at opposite direction with the magnetic field "B" 212. In this example, the opposite direction of the magnetic field created by the sink coil 204 may actually reinforce the magnetic field "B" 212 generated by the driving coil 202. At a certain frequency (e.g., $\omega_1$ 224), a maximum current is obtained due to the reinforced induced currents at the sink coil 204. In other words, before the resonant frequency at the $\omega_0$ 208 (e.g., 13.56 MHz) is reached, the reinforced induced currents due to the capacitive coupling may create the maximum current at the resonant frequency $\omega_1$ 224. Similarly, another maximum current at resonant frequency (e.g., $\omega_2$ 226) may result due to the inductive coupling at the sink coil 204.

Because the driving coil 202 is operated at the resonant frequency $\omega_0$ 208, inefficient transfer of energy for NFC and/or WPT purposes may result because the sink coil antenna will be operating at $\omega_1$ 224 and $\omega_2$ 226. To this end, the maximum induced current at the operational frequency of $\omega_0$ 208 may not be generated by the symmetric antenna configuration of the sink coil 204. In an implementation, a dissymmetric antenna is implemented (as shown in FIG. 3) to provide solution for the over coupling as discussed above.

Example Dissymmetric Antenna

Figure 3:
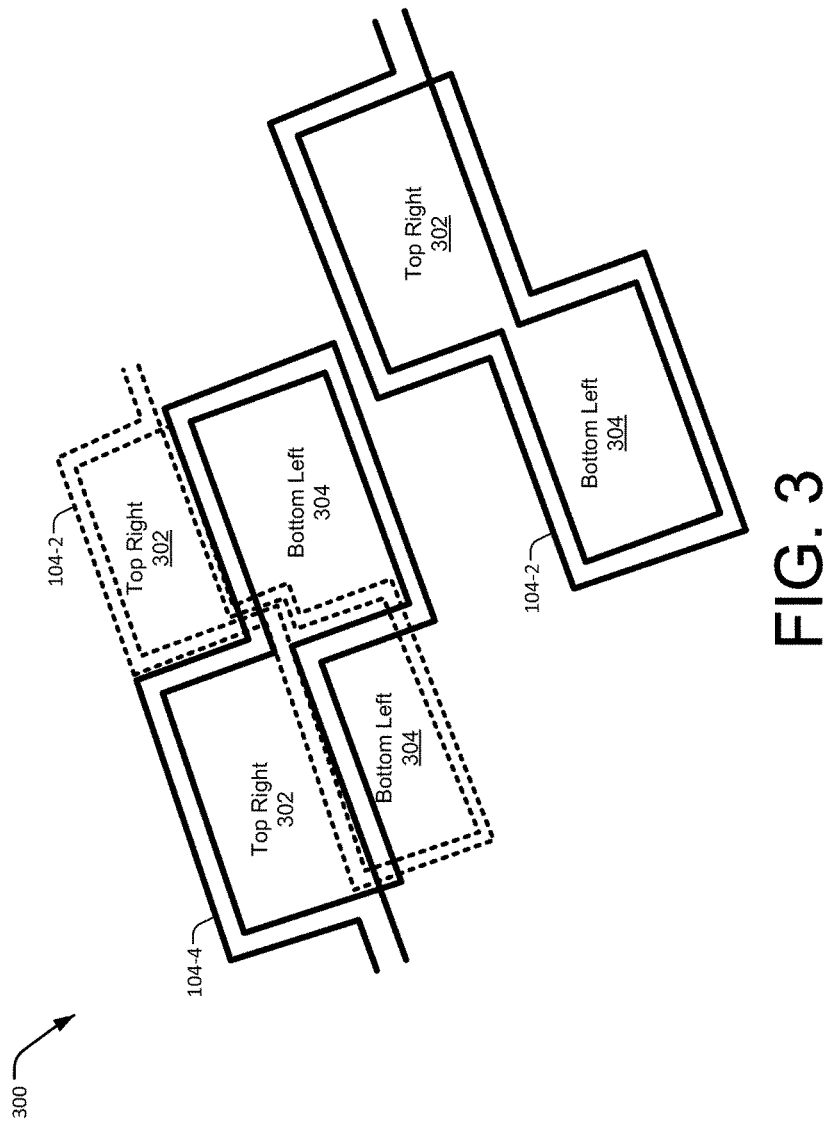
FIG. 3 illustrates an example dissymmetric antenna.

FIG. 3 illustrate a perspective view 300 of disassembled dissymmetric antenna configuration between portable devices 102. The emerging technologies related to near field coupling enable many appealing experiences for users of the portable device 102. For example, the portable device 102 may include a flat coil antenna in their design so that (in part) the portable device 102 may possess the thin aspect ratios and small form factors often sought by users. Moreover, the flat coil antenna may allow for comparative ease in mechanical integration into the thin portable device 102 (when considering mechanical factors in isolation from other considerations such as, the ability of the coils of other portable devices 102 to couple with one another). For instance, integrating a flexible printed circuit (FPC), which incorporates the coil antenna, into a thin portable device 102 may minimize the increase in the thickness of the portable device 102.

With continuing reference to FIG. 2, the drawing illustrates the antenna 104-2 that is disassembled from the portable device 102-2. The antenna 104-2 may include a partially enclosed top right loop 302 that is located at top right side when facing liquid crystal display (LCD) screen (not shown) of the portable device 102-2. Further, the antenna 104-2 may include another partially enclosed bottom left loop 304 that is located at bottom left side (taking the top right loop 202 as a reference). The top right loop 302 and the bottom left loop 304 may form an enclosed loop that may include multiple loops (e.g., 2-3 loops). In an implementation, the antenna 104-4 is not symmetric to the antenna 104-2 when the antenna 104-4 is horizontally flipped at one hundred eighty degrees (180°), and superimposed upon the antenna 104-2. The antenna 104-4 may include the same configuration as the antenna 104-2 configuration when facing the same direction; however, when the antenna 104-4 is horizontally flipped or rotated 180°, the antenna 104-4 is not symmetric (i.e., dissymmetric) in configuration with the antenna 104-2.

As opposed to the symmetric antenna illustrated in FIG. 2 above, the antenna 104-2 and the antenna 104-4 may include a minimized overlapping area when aligned and superimposed with one another. The minimized overlapping area may create a minimal flux linkage between the antenna 104-2 and the antenna 104-4. The minimal flux linkage may prevent over coupling that may generate maximum current(s) at resonant frequencies other than the resonant frequency at $\omega_0$ 208 (e.g., at $\omega_1$ 224 and/or at $\omega_2$ 226).

Further, avoiding the over coupling such as, in "P2P NFC" mode of operation and/or WPT purposes may maintain the operational resonant frequency at $\omega_0$ 208.

In an implementation, the "P2P NFC" at resonant frequency $\omega_0$ 208 is implemented by the dissymmetric antennas 104-2 and 104-4. For example, induced currents at the antenna 102-4, which is acting as a sink antenna, may not create reinforcing magnetic fields (not shown) due to the minimal overlapping area when the antennas 104-2 and 104-4 are aligned and superimposed upon one another. In this example, the induced currents may be generated by the antenna 102-2, which is acting as a driving antenna. Since a minimized reinforcing magnetic fields (not shown) are generated by the dissymmetric antennas 104-2 and 104-4, which are in close proximity with each other, the resonant frequency at $\omega_0$ 208 may be obtained as the operational frequency. For example, the dissymmetric antennas 104-2 and 104-4 may be three (3) to five (5) centimeters of length; however, it is expected that smaller sizes may be implemented. The operational resonant frequency at $\omega_0$ 208 of the dissymmetric antennas 104-2 and 104-4 may create the maximum current for "P2P NFC" and/or WPT purposes. In other implementations, the dissymmetric antennas 104-2 and 104-4 may be used in NFC tag and reader mode operations. For example, the antenna 104-2 may be used to read identification data in the NFC tag during reading mode operations at the portable device 102-2.

Example Process

Figure 4:
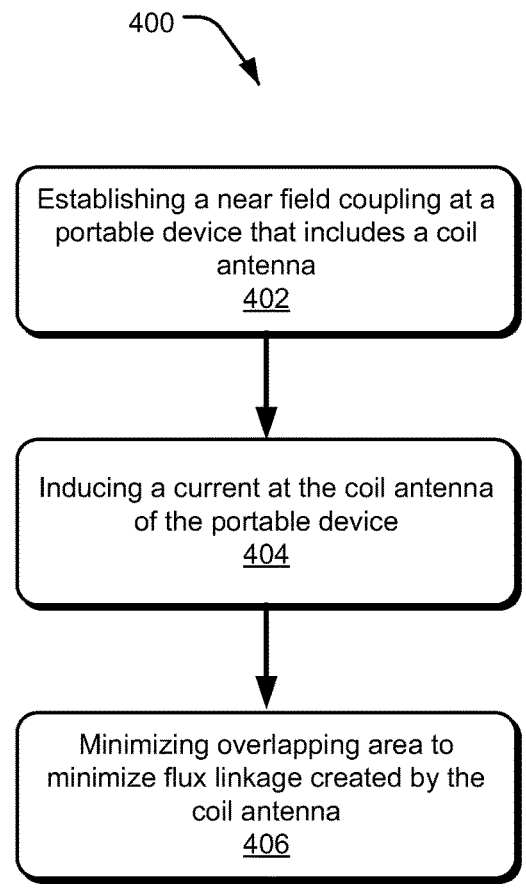
FIG. 4 is a method for coupling a portable device to facilitate near field coupling.

FIG. 4 shows an example process chart illustrating an example method for coupling a portable device to facilitate near field communications. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, establishing a near field coupling at a portable device is performed. In an implementation, a first portable device (e.g., portable device 102-2) may establish near field coupling with a second portable device (e.g., portable device 102-4) by placing the portable device 102-2 at back to back location with the portable device 102-4. In an implementation, the portable device 102-2 may include a coil antenna (e.g., antenna 104-2) that is dissymmetric with another coil antenna (e.g., antenna 104-4) contained at the portable device 102-4. In other words, when a) the portable devices 102-2 and 102-4 are positioned back to back from each other; b) aligned; and c) superimposed from one another, the antennas 104-2 and 104-4 are not symmetric. The lack of symmetry may create a minimized overlapping area between the aligned and superimposed antennas 104-2 and 104-4. In an implementation, each of the antennas 104-2 and 104-4 may include an upper top right loop (e.g., top right loop 302) and a bottom lower left loop (e.g., bottom left loop 304). The top right loop 302 may be configured to define a plane where flipping horizontally the plane at 180° from a vertical axis, and then superimposing the flipped top right loop 302 to the original plane location, may define the minimized overlapping area. Similarly, the bottom left loop 304 may be configured to define a bottom plane where flipping horizontally the bottom plane at 180° from a reference vertical axis, and then superimposing the flipped bottom left loop 304 to the original bottom plane location, may define the minimized overlapping area at the bottom of the antenna configuration. In an implementation, the antenna 104 may include a dedicated antenna for NFC and/or WPT purposes. In other words, the antenna 104-2 and the antenna 104-4 may be configured to operate on a separate resonant frequency (to generate magnetic fields), and independent from another antenna that uses standard frequencies used in wireless communications (e.g., 5 GHz for WiFi signals).

At block 404, inducing a current is performed. For example, the antenna 104-2 may act as a driving coil, and induces a current at the antenna 104-4, which acts as a sink coil. The induced current may be due to capacitive coupling and inductive coupling occurring in charged coils that are in close proximity with one another. The capacitive coupling may create a forward direction (e.g., forward direction 218) and a backward direction (e.g., backward direction 220) of induced currents at the antenna 104-4. On the other hand, the inductive coupling may create a backward direction (e.g., backward direction 222) of induced currents at the antenna 104-4 (according to Lenz's law). To this end, both currents at backward directions 220 and 222 may tend to reinforce one another, while the currents at forward direction 218 and at the backward direction 222 may tend to cancel one another.

At block 406, minimizing overlapping area is performed. In an implementation, the antenna 104-2 is dissymmetric with the antenna 104-4. As discussed above, when the antenna 104-2 is aligned and superimposed upon the antenna 104-4, the minimum overlapping area is obtained. Due to the minimized overlapping area between the antennas 104-2 and 104-4, a minimized flux linkage is generated in return by the antenna 104-4, which acts as the sink coil. Accordingly, over coupling may be avoided in order for the antennas 104-2 and 104-4 to operate at resonant frequency (e.g., at $\omega_0$ 208).

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A portable device comprising:
    a housing;
    a continuous loop of coil antenna line installed at the housing, the continuous loop of coil antenna forms a first closed loop that defines a first plane and a second closed loop that defines a second plane, wherein the first plane is coplanar and dissymmetric with the second.

2. A portable device as recited in claim 1, wherein the first closed loop includes a multiple partially closed top right loop to define the first plane, and the second closed loop includes a multiple partially closed bottom left loop to define the first plane the second plane, respectively.

3. A portable device as recited in claim 1, wherein the coil antenna is identical to all portable devices.

4. A portable device as recited in claim 1, wherein the coil antenna is operated at resonant frequency of 13.56 MHz to implement "peer-to-peer (P2P) near field communication (NFC)" and/or wireless power transfer (WPT).

5. A portable device as recited in claim 1, wherein the coil antenna is a dedicated antenna that is used for near field communication (NFC) tag and reader mode operations for the portable device.

6. A portable device as recited in claim 1, wherein the portable device is selected from a group consisting of a mobile phone, a cellular phone, a smartphone, a personal digital assistant, a tablet computer, a netbook, a notebook computer, a laptop computer, a multimedia playback device, a digital music player, a digital video player, a navigational device, and a digital camera.

7. A method of coupling a portable device comprising:
establishing a near field coupling at the portable device that includes a continuous loop of coil antenna line, wherein the coil antenna further forms a first closed loop that defines a first plane and a second closed loop that defines a second plane, wherein the first plane is coplanar and dissymmetric with the second plane; and
inducing a current to the coil antenna at resonant frequency.

8. A method as recited in claim 7, wherein the first and second closed loops include multiple loops.

9. A method as recited in claim 7, wherein the coil antenna is identical to all portable devices.

10. A method as recited in claim 7, wherein the coil antenna is operated at resonant frequency of 13.56 MHz to implement peer-to-peer (P2P) near field communication (NFC) and/or wireless power transfer (WPT).

11. A method as recited in claim 7, wherein the coil antenna is a dedicated antenna that is used for near field communication (NFC) tag and reader mode operations for a portable device.

12. A method as recited in claim 7, wherein the coil antenna is embedded at a portable device that is selected from a group of a mobile phone, a cellular phone, a smartphone, a personal digital assistant, a tablet computer, a netbook, a notebook computer, a laptop computer, a multimedia playback device, a digital music player, a digital video player, a navigational device, and a digital camera.

13. A device comprising:
a continuous loop of coil antenna line that forms a first closed loop, which defines a first plane, and a second closed loop that defines a second plane, wherein the first plane is coplanar and dissymmetric with the second plane.

14. A device as recited in claim 13, wherein the first closed loop includes a partially closed top right loop while the second closed loop includes a partially closed bottom left loop to define the first plane and the second plane, respectively.

15. A portable device as recited in claim 13, wherein the closed loop includes multiple loops.

16. A device as recited in claim 13, wherein the coil antenna is identical to all portable devices.

17. A device as recited in claim 13, wherein the coil antenna is operated at resonant frequency of 13.56 MHz to implement peer-to-peer (P2P) near field communication (NFC) and/or wireless power transfer (WPT).

18. A device as recited in claim 13, wherein the coil antenna is used for near field communication (NFC) tag and reader mode operations for a portable device.

19. A device as recited in claim 13, wherein the coil antenna is a dedicated antenna used for near field coupling and/or wireless power transfer purposes.

20. A device as recited in claim 13, wherein the device is included at a portable device that is selected from a group of a mobile phone, a cellular phone, a smartphone, a personal digital assistant, a tablet computer, a netbook, a notebook computer, a laptop computer, a multimedia playback device, a digital music player, a digital video player, a navigational device, and a digital camera.

* * * * *